United States Patent
Chandrasekar et al.

(10) Patent No.: US 9,687,895 B2
(45) Date of Patent: Jun. 27, 2017

(54) LARGE STRAIN EXTRUSION MACHINING PROCESSES AND BULK FORMS PRODUCED THEREFROM

(75) Inventors: Srinivasan Chandrasekar, West Lafayette, IN (US); Kevin Trumble, West Lafayette, IN (US); Wilfredo Moscoso, West Lafayette, IN (US); Mert Efe, Lafayette, IN (US); Dinakar Sagapuram, West Lafayette, IN (US); Christopher J. Saldana, Springfield, VA (US); James Bradley Mann, West Lafayette, IN (US); Walter Dale Compton, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 917 days.

(21) Appl. No.: 13/977,859

(22) PCT Filed: Jan. 6, 2012

(86) PCT No.: PCT/US2012/020498
§ 371 (c)(1),
(2), (4) Date: Sep. 26, 2013

(87) PCT Pub. No.: WO2012/094604
PCT Pub. Date: Jul. 12, 2012

(65) Prior Publication Data
US 2014/0017113 A1   Jan. 16, 2014

Related U.S. Application Data

(60) Provisional application No. 61/430,284, filed on Jan. 6, 2011.

(51) Int. Cl.
*B21C 23/00* (2006.01)
*B29C 47/00* (2006.01)
*B29C 47/12* (2006.01)

(52) U.S. Cl.
CPC ............ *B21C 23/00* (2013.01); *B21C 23/005* (2013.01); *B29C 47/0014* (2013.01); *B29C 47/0019* (2013.01); *B29C 47/124* (2013.01)

(58) Field of Classification Search
CPC ...... B22F 9/04; B22F 2009/046; B21C 23/01; B29C 47/0019
USPC ....................................................... 148/400
See application file for complete search history.

(56) References Cited

U.S. PATENT DOCUMENTS

| 5,651,648 | A | 7/1997 | Furey | |
| 7,617,750 | B2* | 11/2009 | Moscoso | B21C 23/001 82/1.11 |
| 8,137,614 | B2* | 3/2012 | Stinson | A61L 31/022 420/417 |
| 2006/0243107 | A1 | 11/2006 | Mann | |

(Continued)

*Primary Examiner* — Jei Yang
(74) *Attorney, Agent, or Firm* — Hartman Global IP Law; Gary M. Hartman; Michael D. Winter (57) ABSTRACT

Processes by which bulk forms can be produced in a single continuous operation, as opposed to multi-stage deformation processes that involve a series of separate and discrete deformation operations or stages. Such processes generally entail deforming a solid body using a large-strain extrusion machining technique and deformation conditions that obtain a predetermined crystallographic texture in the continuous bulk form that differs from the crystallographic texture of the solid body.

29 Claims, 6 Drawing Sheets

(56) References Cited

U.S. PATENT DOCUMENTS

2007/0013103 A1    1/2007   Zhang
2008/0138163 A1    6/2008   Moscoso

* cited by examiner

LARGE STRAIN EXTRUSION MACHINING PROCESSES AND BULK FORMS PRODUCED THEREFROM

CROSS REFERENCE TO RELATED APPLICATIONS

This application claims the benefit of International Application No. PCT/US2012/020498 filed Jan. 6, 2012, having a claim of priority to U.S. provisional patent application No. 61/430,284, filed Jan. 6, 2011.

BACKGROUND OF THE INVENTION

The present invention generally relates to methods of producing bulk forms with controllable microstructures, and more particularly to a large-strain extrusion machining process capable of directly producing bulk forms that have controlled microstructures, including controlled crystallographic textures. The extrusion machining process is capable of forming bulk forms from materials that are typically difficult to fabricate in continuous bulk forms, such as sheets, plates, foils, strips, ribbons, bars, wires, rods, filaments, etc.

Significant benefits can be gained by deforming metals and metal alloys through the application of very large plastic strains. Principal among these are microstructure refinement and enhanced mechanical and physical properties. As an example, there is current interest in the use of "severe" plastic deformation (SPD) to produce bulk forms with controlled microstructures. Such microstructures include, but are not limited to, ultra-fine grained (UFG) microstructures, for example, nanocrystalline structures (NS) characterized by their atoms arranged in crystals with a nominal dimension of less than one micrometer and particularly less than 500 nm.

Multi-stage deformation processing is one of the most widely used experimental SPD techniques for studying microstructural changes produced by very large strain deformation. Notable examples include rolling, drawing, and equal channel angular extrusion (ECAE) processes. In a multi-stage deformation process, very large plastic strains (shear strains of four or more) are imposed in a specimen by the cumulative application of deformation in multiple discrete stages. The effective strain in each stage of deformation is typically on the order of about one or more. However, there are limitations and disadvantages with these SPD processing techniques. A significant limitation is the inability to induce large strains in high-strength materials, such as nickel-based high-temperature alloys and tool steels, as well as materials that are traditionally difficult to deform. Particularly notable examples of the latter include metals having hexagonal close-packed (hcp) structures, including magnesium, titanium and their alloys. Other limitations include the difficulty of imposing strains of much greater than one and the inability to impose strains of much greater than two in a single stage of deformation, the considerable uncertainty of the deformation field, and the minimal control over important variables of the deformation field—such as strain, strain rate, temperature, and phase transformations—that would be expected to have a major influence on the evolution of microstructure and material properties.

U.S. Pat. No. 6,706,324 to Chandrasekar et al. discloses machining techniques for the large scale production of nanostructured (nanocrystalline and UFG) materials. According to Chandrasekar et al., large strain deformation during chip formation in machining is capable of significant grain refinement and development of nanocrystalline and UFG microstructures in a wide variety of materials, including metals and alloys. Chandrasekar et al. teach that, compared to typical severe plastic deformation processes, chip formation during machining can impose very large strain deformation conditions that can be systematically varied over a wide range that is over and beyond what is currently obtainable in other SPD processes. Further advancements based on Chandrasekar et al. include the ability to controllably produce chips with a desired shape and size as disclosed in U.S. Pat. No. 7,628,099 to Mann et al., and the ability to produce continuous bodies with a desired shape and size as disclosed in U.S. Pat. No. 7,617,750 to Moscoso et al. In particular, Moscoso et al. disclose a machining process capable of producing continuous forms having a desired microstructure by simultaneously extruding the chip in the immediate vicinity of the tool cutting edge to produce a monolithic body immediately downstream of the cutting edge. The extrusion process can be controlled to produce monolithic bodies with various cross-sectional shapes and sizes.

Notwithstanding the advancements achieved through the teachings of Chandrasekar et al., Mann et al., and Moscoso et al., further capabilities in the production of bulk forms are desirable. A particular but nonlimiting example is the production of magnesium alloys in bulk forms such as sheets, plates, foils, ribbons, and strips (hereinafter simply referred to as sheet products). Although magnesium is abundant in mineral form and can be refined and cast relatively inexpensively, the creation of sheet products is quite expensive due to the poor workability of this hcp metal. Sheet products are traditionally produced from magnesium ingots by either rolling or extruding into final shape, or by directly casting into sheet forms using twin-roll casting (TRC). Enhanced workability (which, as used herein, refers to the ability to accomplish deformation at low stresses and avoid cracking or other defects) has typically been achieved by preheating magnesium ingots to temperatures above 200° C. to promote basal slip or the activation of non-basal slip. Even if preheated, multiple deformation steps are typically needed to not only reduce the thickness of the sheet, but also to accumulate strain in the material and refine microstructure. In the rolling of magnesium ingots, a 15 to 30% thickness reduction per pass is often imposed in three to seven passes, with intermediate annealing performed between passes. Furthermore, processing speeds are typically low (about 30 m/min) to avoid cracking. If TRC methods are used, roll speeds are minimized in order to achieve uniform solidification and crack-free sheets. The cast sheet is then further processed by conventional rolling or differential speed rolling (DSR) in order to homogenize and refine the cast microstructure and reduce the thickness. Nonetheless, significant material losses are an unavoidable consequence of the high temperature steps and material inhomogeneity. Consequently, production costs for magnesium alloy sheet products are high in comparison to those of conventional alloy sheet products, for example, aluminum and steel alloys.

As known in the art, the lack of workability of magnesium and its alloys is a direct result of an insufficient number of active independent deformation modes required for homogeneous deformation. Main deformation modes active at low temperatures (for example, about 25 to 200° C.) are the basal slip and the $\{10\bar{1}2\}$ mechanical twinning. An intensive (0002) crystallographic texture develops during conventional rolling that also adversely affects the final workability of magnesium and other low-workability hcp metals. As known in the art, crystallographic texture refers to the degree to which grain crystal axes are aligned within a material. The (0002) crystallographic texture that develops in magnesium is characterized by the basal poles becoming aligned normal (perpendicular) to the rolled surfaces (and therefore the rolling direction) and exhibiting fiber symmetry. The near-zero Schmid factor for the basal slip realized during the forming operations, as a result of this crystallographic texture, results in limited plasticity. On the other hand, workability of magnesium alloys can be promoted by random texture or non-basal (tilted basal) textures, in other words, basal poles tilted at an angle with respect to the normal direction to the sheet product surfaces. However, achieving a random-textured wrought product, especially in hexagonal close-packed metals, is difficult. Grain size is also known to significantly influence the mechanical properties in magnesium and other hcp materials, and finer grain sizes have been shown to enhance both strength and ductility. Though in comparison to conventionally rolling methods, current SPD processes such as ECAE and high-pressure torsion (HPT) are capable of producing finer microstructures and less intensive (0002) crystallographic textures that are essential for subsequent sheet forming or superplastic forming, these techniques cannot be used to make sheet directly from ingot or billet because they do not provide for large shape changes or continuous production.

In view of the above, there is a need for processes capable of producing bulk forms with controllable microstructures, and more particularly processes capable of directly producing continuous bulk forms that have controlled microstructures, including controlled crystallographic textures, from materials that are typically difficult to fabricate in continuous bulk forms.

BRIEF DESCRIPTION OF THE INVENTION

The present invention provides a process by which bulk forms can be produced in a single continuous operation, as opposed to multi-stage deformation processes that involve a series of separate and discrete deformation operations or stages. Bulk forms that can be produced by the process of this invention include continuous forms, for example, sheet products (sheets, plates, foils, strips, ribbons, etc.), bars, wires, rods, filaments, etc.

According to a first aspect of the invention, a process is provided that generally entails deforming a solid body having a microstructure characterized by a grain size and a crystallographic texture. The deforming step is a single continuous step in which material is obtained from the solid body while being subjected to steady-state deformation conditions to continuously produce a continuous bulk form having a continuous cross-sectional form that differs from the solid body. The deformation conditions include a thickness ratio ($\lambda$) equal to $t_c/t_o$ where $t_c$ is a thickness of the continuous bulk form and $t_o$ is the undeformed thickness of the material of the solid body prior to being subjected to the deformation conditions. The deforming step comprises intentionally setting the thickness ratio to obtain a predetermined crystallographic texture in the continuous bulk form that differs from the crystallographic texture of the solid body.

According to another aspect of the invention, a process is provided that generally entails deforming a casting in a single step to continuously produce a continuous bulk form having a longitudinal direction and a continuous cross-sectional form. The casting has a microstructure characterized by a grain size and crystallographic texture, and the continuous bulk form has a microstructure characterized by a grain size and a crystallographic texture. At least the crystallographic texture of the continuous bulk form is different from the crystallographic texture of the casting.

According to yet another aspect of the invention, a process is provided that generally entails machining a solid body with a cutting tool to continuously produce a continuous bulk form and impose a shear strain ($\gamma$) on the solid body, and controlling at least $\alpha$ and $\lambda$ so that the continuous bulk form has a predetermined crystallographic texture, wherein $\alpha$ is the tool rake angle of the cutting tool, $\lambda=t_c/t_o$, $t_c$ is a thickness of the continuous bulk form, and $t_o$ is the depth of cut of the cutting tool.

Other aspects of the invention include bulk forms that can be produced by processes of the types described above, with the result that such bulk forms are continuous in a longitudinal direction thereof and have a continuous cross-sectional form transverse to the longitudinal direction. As a particular example, a bulk form may have a crystallographic texture characterized by grains of the bulk form having crystallographic orientations that are predominantly disposed at an oblique angle to the longitudinal direction and to a first surface of the bulk form. As another particular example, a bulk form may be produced by deforming a casting to have a substantially uniform crystallographic texture.

In view of the above, the present invention provides deformation processes capable of producing a variety of continuous bulk forms having controlled microstructures, including crystallographic textures. The deformation processes can be described as large-strain extrusion machining processes, and preferably involve the use of controlled shear strains, strain rates, and hydrostatic pressures within a confined deformation zone, and localization of plastic deformation-induced heating within the deformation zone to yield bulk forms capable of having controlled crystallographic textures and microstructures that promote the workability of a variety of materials, for example, castings and hcp materials such as magnesium alloys. Beneficial crystallographic textures include but are not limited to random and shear-type textures (for example, non-basal (tilted basal) textures in hcp metals), and beneficial microstructures include but are not limited to micron-sized grains and ultra-fine grained (UFG) microstructures, including nanocrystalline structures (NS). Such benefits can be achieved without preheating or with a reduced need for preheating prior to the deformation process.

From the above, it should also be evident that the present invention is capable of providing controllable and low-cost methods for synthesizing bulk forms that can be produced from materials that are otherwise difficult to deform, especially hcp materials such as magnesium, titanium and their alloys.

Other aspects and advantages of this invention will be better appreciated from the following detailed description.

BRIEF DESCRIPTION OF THE DRAWINGS

FIG. 6 contains through-thickness images taken from RFN-CFD cross-sections of strips and shows texture evolution with increasing To.

DETAILED DESCRIPTION OF THE INVENTION

The following discussion is directed to processes and systems by which bulk forms can be produced in a continuous operation that imposes large values of deformation strain (for example, shear strains of about one or more) in a single pass or stage. Such an approach is in contrast to multi-stage deformation processes used in the past that achieve large cumulative deformation strain through a series of separate and discrete deformation operations or stages. The preferred process can be carried out in a machining operation that combines the processes of chip formation and extrusion. For convenience, such a combined machining-extrusion process can be referred to as large strain extrusion machining (LSEM). By combining the advantages of chip formation in machining with that of extrusion processing, bulk forms having desirable microstructures, including but not limited to nano-scale grains, ultra-fine grains (UFG), and micron-sized grains, can be produced by appropriately controlling the conditions within a deformation zone created during chip formation in the LSEM process. Bulk forms that can be produced with the LSEM process include, for example, sheet products (sheets, plates, foils, strips, ribbons, etc.), bars, wires, rods, filaments, etc. Such bulk forms can be described as having a continuous cross-section, which refers to the generation of a cross-section that is substantially constant along the direction of extrusion, as opposed to referring to an uninterrupted cross-section transverse to the direction of extrusion. Such bulk forms can be produced from solid bodies such as castings (including cast ingots) as well as various forms of metals and alloys that exhibit poor workability, especially magnesium alloys (for example, Mg alloy AZ31B) and commercially pure (CP) titanium, which have hcp crystal structures. However, the invention is also applicable to various other materials, including specialty alloys (for example, high-strength superalloys) and more conventional materials (for example, aluminum and its alloys, stainless steel alloys, copper and its alloys, etc., having fcc and bcc structures).

Systems and techniques suitable for use with the present invention include those disclosed in U.S. Pat. No. 7,617,750 to Moscoso et al. However, the present invention goes beyond the teachings of Moscoso et al., by the ability to produce bulk forms having controlled crystallographic textures as a result of using controlled deformation paths, imposing controlled shear strains, strain rates, and hydrostatic pressures within a deformation zone, and the localization of the plastic deformation-induced heating deformation temperature within the deformation zone. In particular, crystallographic textures can be controlled by controlling a deformation thickness ratio of the LSEM process and controlling the localized deformation temperature by controlling the deformation velocity (with or without preheating of the bulk body) of the LSEM process. The deformation thickness ratio, denoted herein by $\lambda$, is the ratio of the thickness ($t_c$) of the continuous bulk form produced by the LSEM process to the undeformed thickness ($t_o$) of the material of the solid body prior to being subjected to the deformation conditions.

Figure 1:
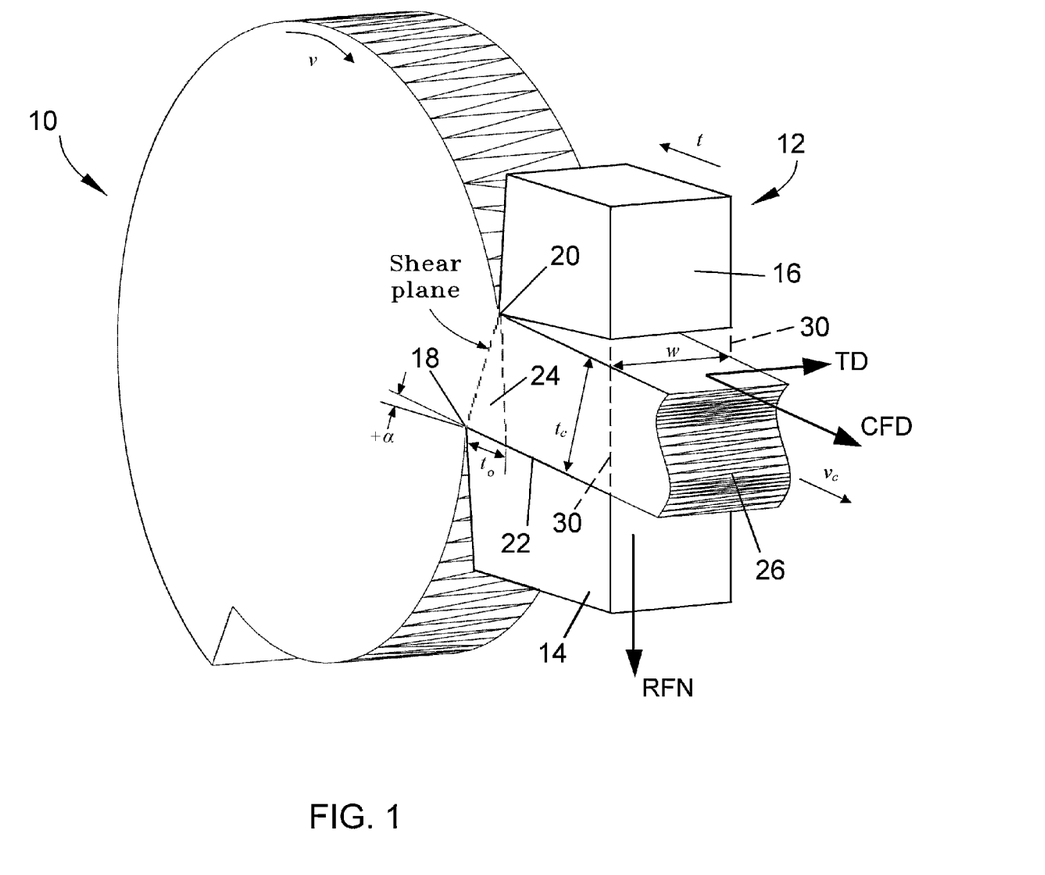
FIG. 1 schematically represents an extrusion-machining system adapted for simultaneously cutting and extruding material to produce an extrudate in accordance with an embodiment of this invention.

FIG. 1 schematically represents a system capable of carrying out an LSEM process of this invention through a combination of machining and extrusion processes performed in a single-stage operation. The operation is illustrated as a turning operation, such as on a lathe, in which a solid body (workpiece) 10 is rotated while a relatively stationary cutting tool assembly 12 is fed in a generally radial direction into the workpiece 10. While a turning operation is represented in FIG. 1, other machining operations are also within the scope of the invention, including others where relative movement between a workpiece and cutting tool is primarily through movement of the workpiece against a relatively stationary cutting tool, as well as linear machining operations in which relative movement between the workpiece and cutting tool is primarily through movement of the cutting tool against a relatively stationary workpiece, or vice versa.

The workpiece 10 is a solid body that can be formed of a wide variety of materials, such as a metal or metal alloy, and can be in a variety of forms, including but not limited to cast, wrought, and PM (powder metallurgy) ingots. Furthermore, the workpiece 10 may have essentially any microstructure, and may even have a single-crystal microstructure. It is also possible that the workpiece 10 could be formed of a polymeric material, in which case the term "microstructure" of the workpiece 10 can be used to characterize the molecular structure and crystallinity within the workpiece 10.

As the tool assembly 12 is plunged into the workpiece 10 at a given feed rate t (m/rev) and the workpiece 10 rotates with a given surface velocity v (m/s), material is cut and extruded from the workpiece 10, producing a long, continuous extrudate 26 of width (w) and thickness ($t_c$). Directions represented in FIG. 1 relative to the extrusion direction of the extrudate 26 include a rake face normal (RFN) direction, a chip-flow direction (CFD), and a transverse direction (TD). The rate of production (i.e., the length of extrudate produced per unit time) is the extrudate velocity $v_c$ ($v_c = v \cdot t/t_c$). The cutting tool assembly 12 is represented in FIG. 1 as including two members 14 and 16. Though schematically depicted as being completely separate from each other, the members 14 and 16 are preferably physically coupled or attached to each other to enable their positions relative to each other to be accurately maintained during use of the cutting tool assembly 12. For this purpose, the members 14 and 16 can be mounted so that one or both are accurately adjustable relative to the other, or can be portions of a unitary body that was machined or otherwise processed so that the members 14 and 16 are permanently fixed relatively to each other, effectively defining opposing walls of an extrusion die. Furthermore, though the members 14 and 16 are shown as defining only two opposing walls or surfaces that define a passage through which the extrudate 26 travels, the cutting tool assembly 12 or its members 14 and/or 16 could be formed to also provide lateral walls that interconnect the opposing surfaces of the members 14 and 16, effectively defining an orifice of an extrusion die. A particular example of a suitable tool for use with this invention is disclosed in W. Moscoso, M. R. Shankar, J. B. Mann, W. D. Compton and S. Chandrasekar, Bulk Nanostructured Materials by Large Strain Extrusion Machining, J. Mater. Res. 22 (2007) 201-205.

In reference to the orientation depicted in FIG. 1, the lower member may be termed a cutting member 14 and defines a cutting edge 18 for cutting the workpiece 10, in which case the upper member in FIG. 1 may be termed a constraining member 16, which is shown as being wedge-shaped and defining a constraining edge 20 that constrains a volume of material being removed from the workpiece 10. The constrained volume of material, which may be referred to as an undeformed chip, is within a roughly triangular-shaped region that will be termed the primary deformation zone 24, and is bounded by a shear plane between the cutting and constraining edges 18 and 20 (where shear strain ($\gamma$) is imposed during chip formation) and two planes that extend from the cutting and constraining edges 18 and 20, respectively, and intersect along the rake face 22 a distance from the cutting edge 18 equal to the thickness ($t_o$) of the undeformed chip (corresponding to the depth of cut). Once the constrained volume of material is dislocated from its original location on the workpiece 10, the constraining member 16 imposes dimensional control over this material to form the extrudate 26. The constraining edge 20 of the constraining member 16 and the rake face 22 of the cutting member 14 define an opening within which the material obtained from the workpiece 10 is simultaneously constrained while being dislocated from the workpiece 10, thereby defining the size and shape of the resulting deformed extrudate 26 exiting the tool assembly 12.

It should be appreciated that the size of the opening between the cutting and constraining edges 18 and 20 can be altered to produce a change in a deformation strain level induced in the material during deformation as a result of altering the deformation thickness ratio ($\lambda = t_c/t_o$). In the example represented in FIG. 1, the extrudate 26 has a cross-sectional shape with two orthogonal dimensions defining the thickness ($t_c$) and width (w) of the extrudate 26, and the deformation process is shown as inducing a change in only the thickness ($t_c$) of the extrudate 26. As noted above, by forming the tool assembly 12 to include lateral walls or surfaces 30 (shown in phantom in FIG. 1) that interconnect the opposing surfaces of the cutting and constraining members 14 and 16 to effectively form an extrusion orifice, the tool assembly 12 can be further capable of altering the width dimension (w) of the extrudate 26. Such a capability can enable the manufacture of, for example, bars, wires, rods, and filaments of controlled dimensions.

Conventional machining techniques typically result in relatively small chip sizes, albeit severely deformed and often composed entirely of a UFG microstructure. Furthermore, unlike SPD techniques, chips formed by conventional machining have seemingly random geometries and geometric control of the deformed material is not usually feasible. With the present invention, a level of control is achieved over the geometry of the extrudate 26 produced by simultaneously machining and extruding. In this manner, the advantages of a large strain deformation achievable with machining are combined with dimensional controls achievable with extrusion processes.

According to a preferred aspect of the invention, the single-pass process represented in FIG. 1 is also capable of ensuring deformation parameters, including large strain values, that are sufficient to induce formation of a desired microstructure within the deformed extrudate 26. More particularly, investigations leading to the present invention demonstrated that sufficiently large but controlled deformation strains ($\gamma$) and deformation temperatures ($T_{def}$) within the deformation zone 24 can be achieved to produce a desired microstructure, including crystallographic texture, within the extrudate 26. More particularly, deformation strains and temperatures can be controlled by modifying the geometry of the deformation zone 24 through suitable positioning of the constraining edge 20 relative to the cutting edge 18 and rake face 22 of the cutting tool assembly 12, as well as controlling the deformation velocity (corresponding to the surface velocity, v, of the workpiece 10).

Certain investigations leading to the present invention included the use of machining setups based on that schematically represented in FIG. 1. As the material of the workpiece 10 is continuously fed to the tool assembly 12 by advancing the tool assembly 12 towards the workpiece at a constant feed rate (t), the initially undeformed material passes through the shear plane and enters the wedge-shaped deformation zone 24, where deformation takes place. Based on upper bound theory, the deformation shear strain depends on the tool rake angle ($\alpha$) and the thickness ratio ($\lambda$). As previously noted, the thickness ratio ($\lambda$) is defined as the ratio of the thickness ($t_c$) of the extrudate 26 to the thickness ($t_o$) of the undeformed chip within the deformation zone 24 ($\lambda = t_c/t_o$). The tool rake angle ($\alpha$) is depicted in FIG. 1 as being positive. In this upper bound model, the deformation shear strain ($\gamma$) is given by:

$$\gamma = \lambda/\cos\alpha + 1/\lambda\cos\alpha - 2\tan\alpha \qquad \text{EQ. 1}$$

Figure 2:
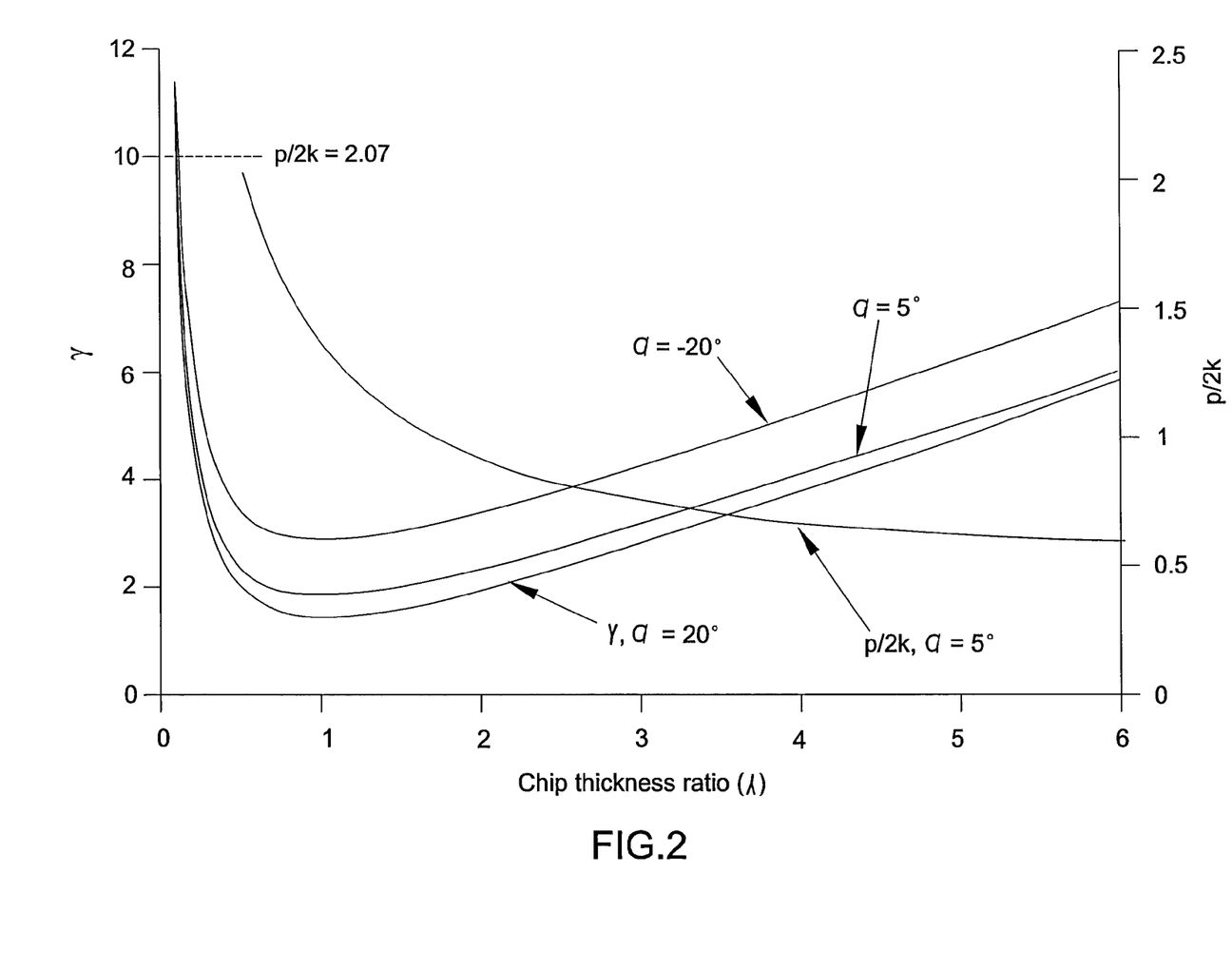
FIG. 2 is a graph showing deformation shear strain and hydrostatic pressure as a function of a deformation thickness ratio for a machining operation of a type that can be performed with the system of FIG. 1.

Based on EQ. 1, the deformation shear strain ($\gamma$) can be plotted as a function of the thickness ratio ($\lambda$), as represented in FIG. 2. The deformation shear strain value can be seen to increase monotonically with increasing separation between the cutting and constraining members 14 and 16. When the separation between the constraining edge 20 and the cutting tool rake face 22 (i.e., the thickness ($t_c$) of the extrudate 26) exceeds the undeformed, unconstrained chip thickness, the process devolves to simple chip formation in machining. However, as the thickness ratio ($\lambda$) decreases from 1 (such that $t_c$ is less than $t_o$), the deformation shear strain increases dramatically. Accordingly, it can be appreciated that the LSEM process of this invention differs from conventional machining and extrusion processes in that the thickness ($t_c$) of the material obtained from the workpiece 10 can be greater or less than that of the material entering the deformation zone 24.

According to a particular aspect of the invention, deformation conditions within the deformation zone 24 can be controlled to modify the crystallographic texture of the extrudate 26 by intentionally controlling the tool rake angle and thickness ratio. The plots in FIG. 2 represent variations of shear strain in copper that were estimated using EQ. 1 for different tool rake angles ($\alpha$) and thickness ratios ($\lambda$). FIG. 2 evidences the ability to control strain using only tool rake angle and thickness ratio. This dependence enables a final strain state in the extrude 26 to be achieved through a multiplicity of deformation paths, providing far greater flexibility of control of deformation than in conventional machining and extrusion processes.

FIG. 2 also plots the estimated normalized hydrostatic pressure (p/2k, were p is hydrostatic pressure and k is the shear yield stress) in the deformation zone 24 based on a preliminary slip-line field analysis. The hydrostatic pressure (p) in the deformation zone is an important parameter influencing workability of alloys. As evident from FIG. 2, hydrostatic pressure is also a function of the thickness ratio.

FIG. 2 shows the variation of p/2k with the deformation thickness ratio (λ) for a rake angle (α) of 5 degrees, and evidences that hydrostatic pressure decreases with increasing deformation thickness ratio. Hydrostatic pressure can be potentially as small as about 2 k (the uniaxial yield strength), or as large as the pressure corresponding to the smallest thickness ratio used. In view of FIG. 2, process conditions in which the deformation thickness ratio is less than 1 provide unique combinations of large strain (ε) and high hydrostatic pressure, which are conditions well suited for effecting microstructure refinement and deformation processing of alloys of poor workability. By achieving high levels of superimposed hydrostatic compression in the deformation zone 24 combined with the ability to vary the strain rate over orders of magnitude, single-state extrusion machining systems of the type represented in FIG. 1 are capable of subjecting materials with limited number of slip systems (or ductility), such as hcp metals, to high levels of deformation at ambient temperature.

Figure 3:
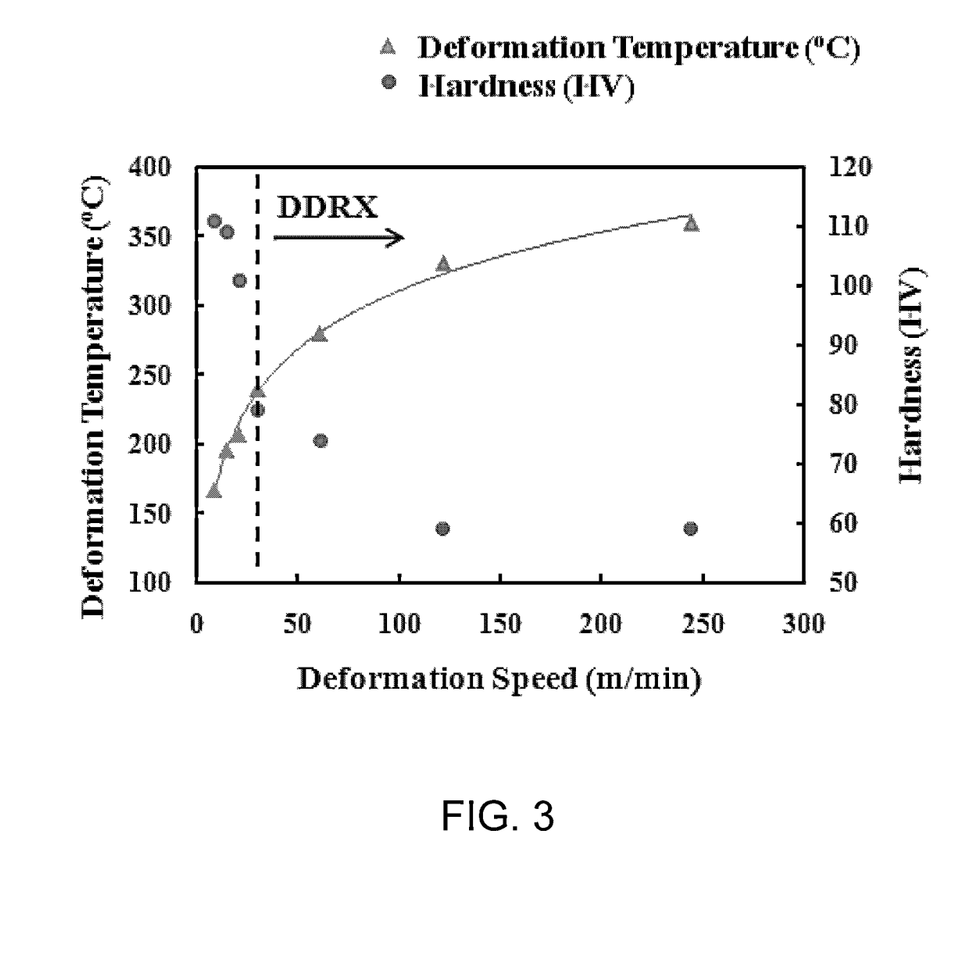
FIG. 3 is a graph plotting data evidencing deformation temperature and hardness as a function of deformation speed for a machining operation of a type that can be performed with the system of FIG. 1.

Simultaneous machining and extrusion processes in the single-stage operation represented in FIG. 1 also lead to substantial adiabatic heating within the deformation zone 24. For example, high deformation speeds (corresponding to the surface velocity (v) of the workpiece 10) of about 10 to about 400 m/min lead to high strain rates and high localized heat generation in the deformation zone 24. As a result, the actual deformation temperature ($T_{def}$) within the deformation zone 24 can be significantly higher than the starting temperature ($T_o$) of the workpiece 10. Such an effect is represented in FIG. 3, and shows that deformation temperature ($T_{def}$) rapidly increased with increasing deformation velocity. According to a preferred aspect of the invention, the additional ability to control heating of the material within the deformation zone 24 leads to the capability to modify and control the crystallographic texture and grain size within the extrudate 26 relative to whatever crystallographic texture or grain size may have been present in the workpiece 10.

On the basis of the above, crystallographic texture of the extrudate 26 can be modified by controlling the strain level (γ), deformation temperature ($T_{def}$) and hydrostatic pressure (p) within the deformation zone 24, which in turn can be controlled by varying the tool rake angle (α), thickness ratio (λ), and/or deformation velocity (v) of the LSEM process of this invention. Of particular interest is the ability to achieve high hydrostatic pressures and temperatures with low thickness ratios (less than 1) and high deformation velocities. Though not ideal for effecting grain refinement, the achievement of these conditions promotes the ability to deform materials that typically exhibit poor workability, including castings and certain materials, for example, magnesium, titanium and their respective alloys, which have a limited number of slip systems operative at room temperature. The combination of high localized adiabatic heating and high hydrostatic pressures within the deformation zone 24 enhances plasticity and avoids fracture during deformation, and also offers the potential for avoiding the need to preheat workpieces formed of materials (such as magnesium alloys) that typically require hot-working. The avoidance or minimizing of preheating also avoids costs associated with controlling the oxidation of the certain materials.

Figure 4:
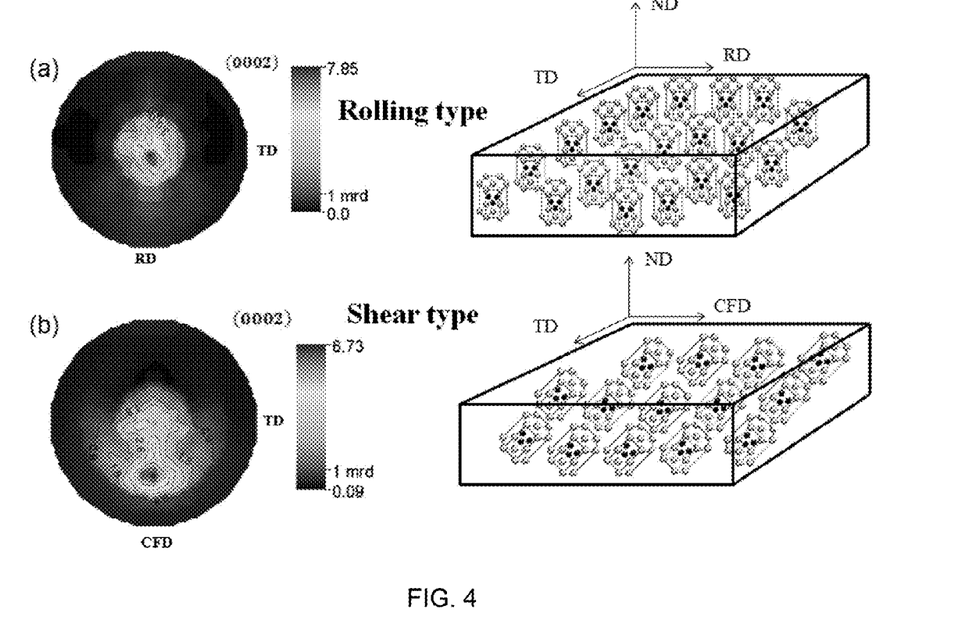
FIGS. 4(a) and 4(b) contain images and diagrams comparing basal and non-basal (tilted) crystallographic textures in sheet products formed from an hcp material.

FIG. 4 contains images and schematic representations depicting differences in crystallographic textures in two sheet products formed of the magnesium alloy known as AZ31B, though it should be understood that the following discussion generally applies to hcp metals, including magnesium, titanium, or their respective alloys. The sheet product of FIG. 4(a) is representative of the crystallographic texture produced in hcp metals by conventional rolling techniques of the prior art, whereas FIG. 4(b) is representative of a crystallographic texture that can be produced in an hcp metal using a system similar to that shown in FIG. 1. In FIG. 4(a), a predominantly basal texture is shown and represented, wherein individual grains are schematically represented as having crystallographic orientations that are perpendicular to the rolled surfaces of the sheet and to the rolling direction (RD) (corresponding to the longitudinal direction) of the rolled sheet, with the result that their (0002) poles are aligned parallel to the normal direction (ND) of the rolled sheet. In contrast, FIG. 4(b) represents a predominantly tilted basal texture, wherein individual grains are schematically represented as having crystallographic orientations that are disposed at an oblique angle to the surfaces of the sheet product and to the CFD (longitudinal) direction (corresponding to RD in FIG. 4(a)) of the sheet product, with the result that their (0002) poles tilted away from the RFN direction (corresponding to ND in FIG. 4(a)) toward the CFD direction of the sheet product (see FIG. 1). For hcp materials such as magnesium and titanium alloys, the microstructure represented in FIG. 4(b) would be significantly more workable than would the microstructure represented in FIG. 4(a). However, the present invention is also believed to be applicable to other crystalline structures, including fcc and bcc structures characteristic of various other metals and alloys, including aluminum and its alloys, stainless steel alloys, copper and its alloys, etc. Accordingly, the crystallographic orientation represented in FIG. 4(a) will also be more generically referred to as a "rolling-type" texture, and the "tilted" crystallographic orientation represented in FIG. 4(b) will also be more generically referred to as a "shear-type" texture, which are terms applicable to materials with non-hcp structures.

In an investigation leading to the present invention, a disc-shaped workpiece having a diameter of about 100 mm and thickness of about 6.3 mm (corresponding to w in FIG. 1) machined from a commercial Mg-AZ31B tooling plate underwent an LSEM process using a system similar to what is shown in FIG. 1. For the particular investigation, deformation speed (v) was varied from 9 m/min to 240 m/min. Based on EQ. 1, shear strain was kept constant at a value of 2 by fixing the tool rake angle (α) at 5 degrees and the thickness ratio (λ) at 0.7. The extrudates were strips whose thicknesses ($t_c$) were kept constant at about 90 micrometers by fixing the feed rate (t) at 125 micrometers. The crystallographic textures of the strips were analyzed using an area detector diffraction system (GADDS) and the diffraction data were processed to produce pole figures using a commercially-available refinement program.

The workpiece had an equiaxed microstructure with a grain size of about 15 micrometers and a hardness of about 60 HV. Data obtained from this investigation was the source of the data contained in FIG. 3, and evidences the effect of deformation speed on deformation temperature. The affect that the deformation temperature had on the hardness of the strips is also plotted in FIG. 3. It can be seen that the deformation temperature initially increased rapidly with deformation speed and tended to saturate at higher speeds. Increasing deformation temperature was accompanied by decreasing hardness. A sharp drop in hardness occurred over a narrow temperature range of about 190 to about 240° C.

Figure 5:
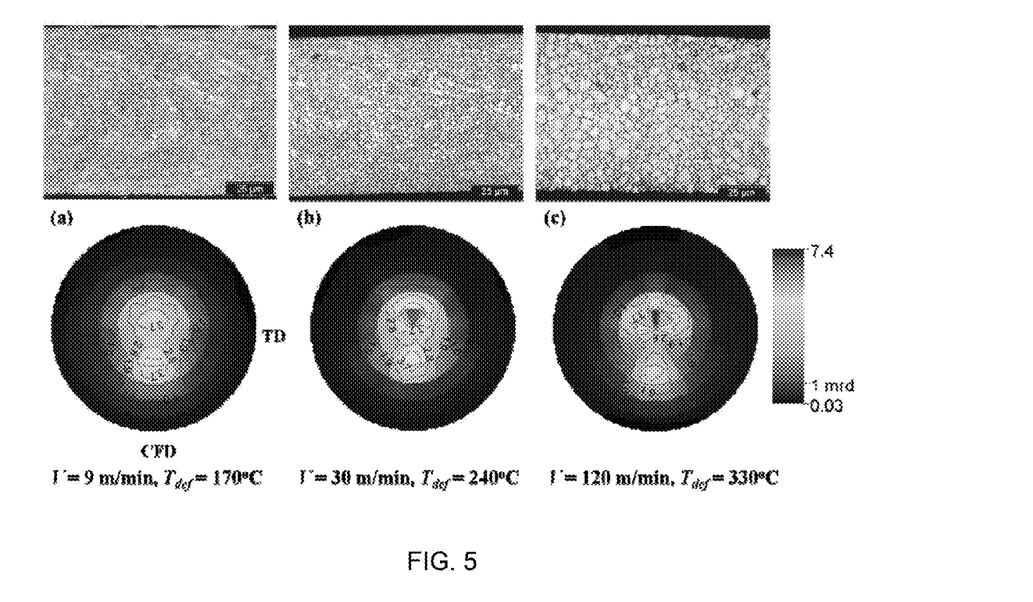
FIG. 5 contains through-thickness images taken from RFN-CFD cross-sections of strips and shows texture evolution with increasing deformation speed.

FIG. 5 depicts the microstructural evolution in the strips relative to the deformation speed (v) and deformation temperature ($T_{def}$). A cold-worked type microstructure with features unresolvable by optical microscope can be observed in image (a) for the strip specimen produced at the deformation speed of 9 m/min. Increasing the deformation speed to 21 m/min resulted in strips with the same microstructural characteristics. Subsequent transmission electron microscopic (TEM) investigations of these cold-worked type structures revealed grain sizes in an ultra-fine grain (UFG) range of about 100 to about 200 nm. These strips were found to have hardnesses of about 110 to 100 HV, or roughly twice the hardness of the workpiece. At a higher deformation speed of 30 m/min, a fine equiaxed grain structure was observed (image b). Further increases in deformation speed resulted in grain sizes increasing from submicron size to a range of about 3-4 micrometers due to grain growth, and saturated above deformation speeds of 120 m/min (image c). The microstructural transition from unresolvable features of image (a) to the fine equiaxed grains of image (b) was attributed to dynamic recrystallization (DRX), and more specifically discontinuous dynamic recrystallization (DDRX) due to the observed decrease in hardness.

FIG. 5 also depicts the crystallographic texture evolution in the Mg-AZ31B strips relative to the deformation speed (v) and deformation temperature ($T_{def}$). At the lower speed of 9 m/min (image a), a predominant tilted basal texture with (0002) poles tilted about 40 to about 50 degrees away from RFN towards CFD (see FIG. 1) was observed. This shear-type texture was attributed to the basal slip in the primary deformation zone, which aligns basal planes parallel to the shear plane. With increasing deformation speed (along with increasing deformation temperature) up to 21 m/min, the texture character remained the same but intensified from 5 mrd to 5.9 mrd (multiples of a random distribution). With further increases in deformation speed to 30 m/min (image b), texture sharply transformed from tilted basal (shear-type) texture to a predominant basal (rolling-type) texture, where (0002) poles were aligned parallel to RFN. However, a low intensity shear-texture component was still present. Further increases in deformation speed led to no texture changes, except for minor intensity changes (image c).

From this investigation, it was concluded that a DRX mechanism occurred in the extrusion-machined strips formed of Mg-AZ31B and was dependent on the deformation temperature. A transition in the DRX mechanism was observed at deformation temperatures of about 210 to about 240° C., below which strips were produced that retained the original tilted basal (shear-type) deformation texture and gradual or no changes in microstructure and hardness were observed, and above which strips with basal (rolling-type) textures, equiaxed microstructures, and sharply lower hardnesses were produced. Consequently, deformation speed and temperature were identified as modifying the crystallographic textures and grain sizes of extrudates produced from a workpiece.

In another investigation leading to the present invention, a disc-shaped workpiece having a thickness of about 6.4 mm (corresponding to w in FIG. 1) and machined from a commercial Mg-AZ31B tooling plate underwent an LSEM process using a system similar to what is shown in FIG. 1. For the particular investigation, a constant rake angle ($\alpha$) of about 5 degrees was used, and a constant thickness ratio ($\lambda$) of about 0.75 was used by fixing the feed rate (t) at 0.25 mm and the extrudate thickness ($t_c$) at 0.19 mm. According to EQ. 1, the effective strain was therefore also constant at about 1.1. In contrast to the prior investigation, a constant deformation speed (v) of 0.5 m/s was used, resulting in a constant strain rate. However, deformation temperature ($T_{def}$) was varied by controlling the initial workpiece (preheating) temperature ($T_o$). A temperature rise ($T_{def}$-$T_o$) of about 170° C. within the deformation zone was estimated from the cutting forces measured using a piezoelectric dynamometer. The initial workpiece temperature was found to have a negligible effect on the temperature rise. A range of initial workpiece temperatures from about 50 to about 375° C. were investigated, corresponding to an estimated variation of about 220 to about 545° C. for the deformation temperature.

The workpiece was examined and determined to have an in-plane basal (rolling-type) texture, an equiaxed microstructure, grain sizes of about 16±2 micrometers, and a hardness of about 58 HV. The LSEM process produced strips that exhibited equiaxed microstructures but much finer grain structures, with grain size increasing from about 1.7 micrometers to about 6.4 micrometers with increasing deformation temperature, especially at initial workpiece temperatures greater than 150° C.

Figure 6:
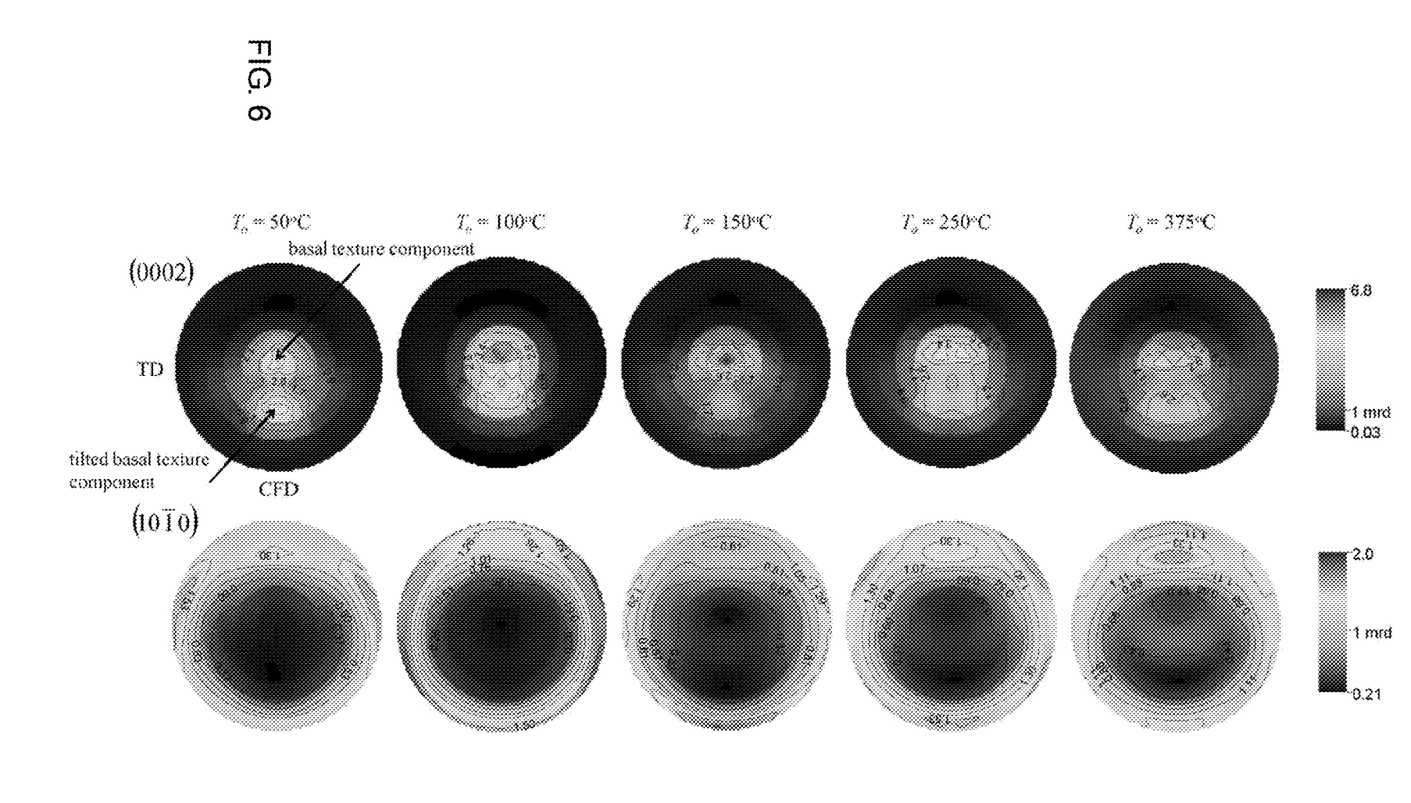

FIG. 6 depicts the crystallographic texture evolution in the strips relative to initial workpiece temperature and, therefore, deformation temperature. The (0002) and (10$\bar{1}$0) pole figures were measured from the TD-CFD plane (see FIG. 1). A mirror symmetry about the CFD axis in the pole figures can be observed. At low initial workpiece temperatures (50° C.), the LSEM process produced strips having two distinct texture components of similar intensity: a tilted basal (shear-type) texture component, and a basal (rolling-type) texture component. The tilted basal texture component was characterized by (0002) basal poles tilted at an angle of about 30 degrees away from RFN toward CFD, while the basal texture component had basal poles aligned parallel to RFN.

From the (10$\bar{1}$0) pole figures, it appeared that the basal and tilted basal texture components exhibited <0001> fiber symmetry. With increasing initial workpiece temperature, the intensity of the tilted basal texture was found to gradually decrease, while that of the basal texture component increased and reached a maximum value of about 6.8 mrd at a initial workpiece temperature of about 150° C. Correspondingly, the basal texture component no longer exhibited <0001> fiber symmetry, and instead the (10$\bar{1}$0) poles became aligned parallel to CFD. Further increases in initial workpiece temperature to about 250° C. resulted in a decrease in texture intensity and splitting of the basal poles about RFN by ±10-20 degrees along TD. The corresponding (10$\bar{1}$0) pole figure indicated that the basal poles had regained fiber symmetry. With further increases in initial workpiece temperature to about 375° C., no qualitative changes in texture were observed. However, with increasing initial workpiece temperature, the peak intensity value initially increased from about 5 mrd at $T_o$=50° C., reached a maximum of about 6.8 mrd at $T_o$=150° C., and then started decreasing to 4 mrd at $T_o$=375° C.

Based on the previous investigation, the fine equiaxed grain structures found in the strips and the grain size variation with deformation temperature were explained by dynamic recrystallization (DRX) followed by dynamic grain growth. Grain size refinement in the strips processed at the low temperatures was concluded to be a result of high shear strain in the LSEM process and restricted grain growth due to the resultant deformation temperature ($T_{def}$) of about 220° C. However, at initial workpiece temperatures greater than 150° C., grain size started to increase rapidly, suggesting an increased activity of dynamic grain growth at moderate temperatures.

The strips exhibited quite different textures (FIG. 6) from one another. As known in the art, deformation texture evolution in a material is primarily influenced by the stress state of deformation, active slip systems, and thermally activated processes like DRX. It was concluded that the two texture components observed in the stip produced at the low initial workpiece temperature (50° C.) was a result of extensive basal slip in the primary and secondary deformation zones, the latter arising from friction between the rake face and strip, especially under conditions where the thickness ratio is less than 1. The shear in the primary deformation zone due to the basal slip aligns the basal planes nearly parallel to the shear plane, resulting in the tilted basal (shear-type) texture component. Similarly, the basal (rolling-type) texture component occurred due to the shear in the secondary deformation zone, which results in alignment of the basal planes parallel to the rake face. Formation of the basal texture component is typical in rolling/compression type deformation, while the tilted basal texture component was the result of shear-based deformation. The increase in initial workpiece temperature to about 100° C. lead to the strengthening of the basal texture component, accompanied by a decrease of tilted basal texture component intensity, consistent with the findings in the prior investigation regarding the onset of DDRX. With increasing initial workpiece temperature to about 150° C., the basal texture was further intensified and displayed a maximum peak intensity of about 6.8 mrd, presumably due to the increased DDRX as a result of a higher deformation temperature. The reason for the alignment of $(10\bar{1}0)$ poles with CFD for this condition was unclear. Further increases in the initial workpiece temperature to about 250° C. caused splitting of basal poles away from RFN along TD, which was surprising in the AZ31B magnesium alloy. Further increases in initial workpiece temperature to about 375° C. led to no significant changes in texture, except for the decreased peak intensity value. The reason for texture weakening at elevated deformation temperatures was unclear.

From the above investigation, it was concluded that LSEM processes of this invention are capable of achieving a variety of non-basal (shear-type) textures in fine-grained AZ31B strips. This ability to control the crystallographic texture in this manner, as well as refine microstructure, would be very useful in achieving mechanical properties such as strength and workability. Deformation temperature was found to greatly influence the microstructure and texture evolution, to the extent that workability enhancement in the AZ31B alloy resulting from non-basal (shear-type) textures (textures containing a tilted basal texture component or exhibiting basal pole splitting) and fine grain sizes appear promising.

Figure 7:
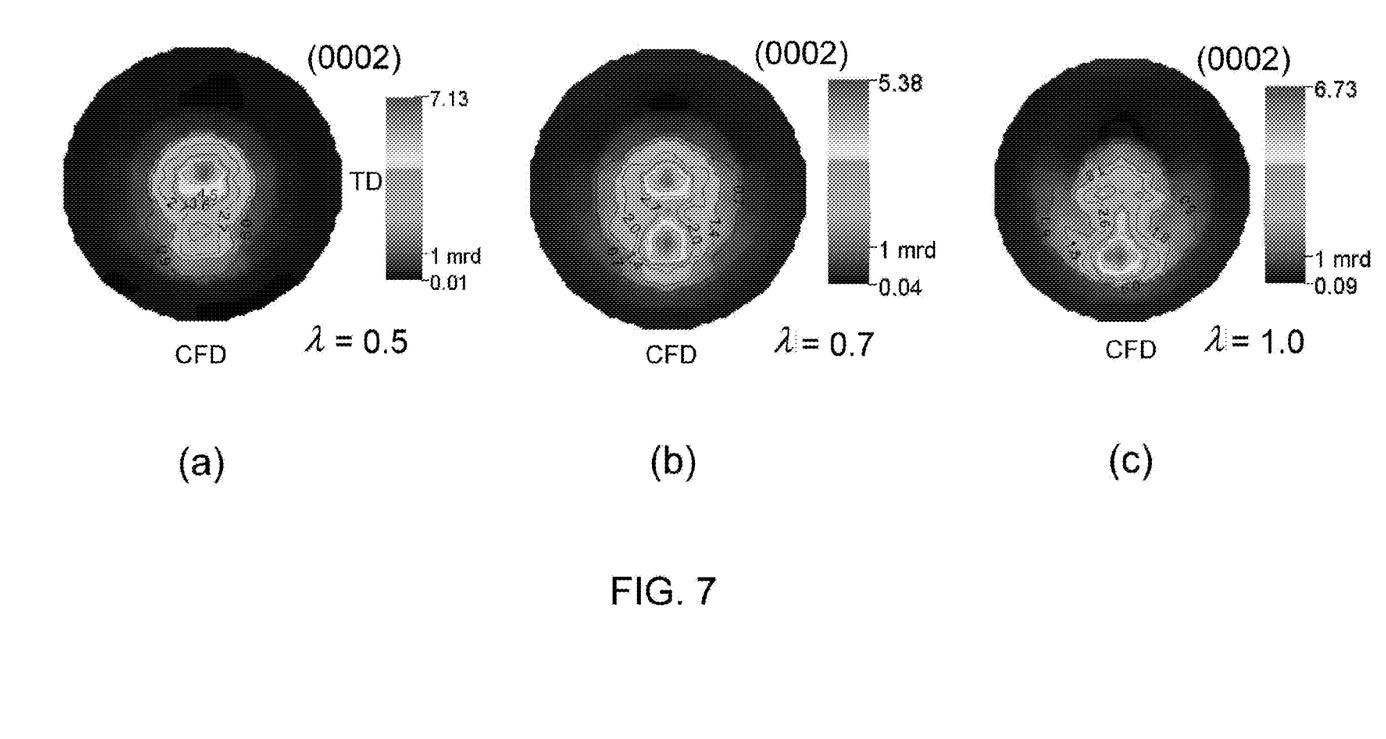
FIGS. 7(a), 7(b) and 7(c) contain images evidencing the effect of deformation thickness ratio on crystallographic textures of sheet products that can be produced with extrusion-machining systems of the type represented in FIG. 1.

Finally, FIG. 7 represents the influence of varying only the deformation thickness ratio ($\lambda$) during an LSEM process carried out with the AZ31B alloy and a system similar to what was employed for the two investigations reported above. In particular, FIG. 7(a) is an image of an extrudate formed using a deformation thickness ratio of about 0.5, with the result that the deformation process is similar to an extrusion process and yields a basal (rolling-type) crystallographic texture similar to what would be obtained with conventional multi-stage sheet rolling processes. In FIG. 7(b), an intermediate deformation thickness ratio of about 0.7 yields a mixture of basal and non-basal (shear-type) textures of the types obtained by, respectively, extrusion (rolling-type) and machining (shear-type). In FIG. 7(c), a higher deformation thickness ratio of about 1 yields a crystallographic texture more similar to that obtained by machining or peeling, in that the texture is pure shear-type. As such, FIG. 7 evidences the ability to produce increasingly non-basal textures over a range of deformation thicknesses ratios of about 0.5 to about 1.0 for a constant deformation temperature, corresponding to increasing workability. These results suggested that, for the purpose of controlling texture, a deformation thickness ratio of about 1 is better than lower thickness ratios.

From the above, it should be evident that the present invention provides the capability for the direct manufacture of large bulk forms such as sheets, foils, plates and bars, as well as finer bulk forms such as ribbons, wires and filaments, in a variety of metal and alloy systems, including materials that are typically difficult to deform, for example, castings of a variety of materials, as well as materials with a limited number of slip systems (or ductility) such as magnesium, titanium and other hcp materials. The shear-type textures characteristic of LSEM processes of this invention are fundamentally distinct from rolling-type textures characteristic of conventional deformation processes (including rolling, extruding, stamping, punching, forging, etc.) produced in non-hcp metals and alloys (including aluminum, copper and iron-based alloys), and are believed to be producible with LSEM processes of this invention in non-hcp metals and alloys as well.

While extrudates were discussed above as continuous monolithic bodies, subsequent processing can be used to cut, break, or otherwise separate the extrudates into articles of desired lengths downstream of the LSEM system. The articles can be a final product suitable for use as-is, or undergo further processing to yield a final product. For example, the crystallographic textures of products produced by the present invention are believed to be maintainable during certain mechanical and thermal processing that might be performed on the products, particular but nonlimiting examples of which include conventional deformation processes such as rolling, stamping, punching, forging, etc., and conventional thermal processes such as annealing, etc.

While the invention has been described in terms of particular embodiments, it is apparent that other forms could be adopted by one skilled in the art. Accordingly, the scope of the invention is to be limited only by the following claims.

The invention claimed is:
1. A process comprising:
deforming a solid body having a microstructure characterized by a grain size and a crystallographic texture,
the deforming step being performed with a cutting tool in a single continuous step in which material is obtained from the solid body while being subjected to steady-state deformation conditions to continuously produce a continuous bulk form having a longitudinal direction and a continuous cross-sectional form that differs from the solid body,
the deformation conditions including the thickness ratio ($\lambda$) equal to $t_c/t_o$ where $t_c$ is a thickness of the continuous bulk form and $t_o$ is the undeformed thickness of the material of the solid body prior to being subjected to the deformation conditions, wherein the deforming step comprises intentionally setting the thickness ratio to obtain a predetermined crystallographic texture in the continuous bulk form that differs from the crystallographic texture of the solid body;
wherein the deforming step is performed at a deformation speed (v) and during the deforming step the thickness ratio ($\lambda$) is sufficiently high and the deforming speed (v) is sufficiently low such that the crystallographic texture in the continuous bulk form is non-basal (tilted basal).
2. The process according to claim 1, wherein the deforming step is performed at least in part by a constraining member that defines an opening through which the material passes and is plastically deformed to produce the continuous bulk form.

3. The process according to claim 2, further comprising the step of altering the size of the opening to produce a change in a deformation strain level induced in the material during the deforming step.

4. The process according to claim 1, wherein the deforming step is performed at least in part by a die through which the material is forced.

5. The process according to claim 1, wherein the solid body moves relative to a cutting edge during the deforming step.

6. The process according to claim 5, wherein the solid body rotates during the deforming step.

7. The process according to claim 1, wherein the continuous bulk form has a cross-sectional shape having two orthogonal dimensions and the deforming step induces a change in only one of the two orthogonal dimensions.

8. The process according to claim 1, wherein the continuous bulk form has a cross-sectional shape having two orthogonal dimensions and the deforming step induces a change in each of the two orthogonal dimensions.

9. The process according to claim 1, wherein the continuous bulk form is chosen from the group consisting of sheets, plates, foils, strips, ribbons, bars, wires, rods, and filaments.

10. The process according to claim 1 wherein the solid body is a casting.

11. The process according to claim 1, wherein the continuous bulk form is a sheet product having opposite surfaces parallel to a direction in which the continuous bulk form travels during the deforming step.

12. The process according to claim 1, wherein the crystallographic texture is characterized by grains of the continuous bulk form having crystallographic orientations that are predominantly disposed at an oblique angle to the longitudinal direction and to a surface of the continuous bulk form.

13. The process according to claim 1, wherein the solid body has an hcp structure.

14. The process according to claim 13, wherein the solid body is formed from magnesium, titanium, or their alloys.

15. The process according to claim 13, wherein the crystallographic texture in the continuous bulk form is non-basal.

16. The process according to claim 13, wherein the crystallographic texture is characterized by basal poles tilted at an oblique angle with respect to a normal direction to a surface of the continuous bulk form.

17. The process according to claim 1, further comprising performing on the continuous bulk form at least one treatment chosen from the group consisting of thermal treatments, mechanical treatments, and thermo-mechanical treatments.

18. The process according to claim 1, wherein the deforming step produces the continuous bulk form to be continuous in a longitudinal direction thereof, have a continuous cross-sectional form transverse to the longitudinal direction, and have a crystallographic texture characterized by grains of the continuous bulk form having crystallographic orientations that are predominantly disposed at an oblique angle to the longitudinal direction and to a surface of the continuous bulk form.

19. The process according to claim 18 wherein the deforming step produces the continuous bulk form to be a sheet product having opposite surfaces parallel to a direction in which the continuous bulk form travels during the deforming step.

20. The process according to claim 18, wherein the deforming step produces the crystallographic texture of the continuous bulk form to be a substantially uniform crystallographic texture.

21. The process according to claim 20, wherein the deforming step produces the continuous bulk form to be a sheet product having opposite surfaces parallel to a direction in which the continuous bulk form travels during the deforming step.

22. The process according to claim 20, wherein the solid body has an hcp structure.

23. The process according to claim 22, wherein the solid body is formed from magnesium, titanium, or their alloys.

24. The process according to claim 22, wherein the deforming step produces the crystallographic texture in the continuous bulk form to be non-basal.

25. The process according to claim 22, wherein the deforming step produces the crystallographic texture to be characterized by basal poles tilted at an oblique angle with respect to a normal direction to a surface of the continuous bulk form.

26. The process according to claim 18 wherein the solid body has an hcp structure.

27. The process according to claim 26, wherein the solid body is formed from magnesium, titanium, or their alloys.

28. The process according to claim 26, wherein the deforming step produces the crystallographic texture in the continuous bulk form to be non-basal.

29. The process according to claim 26, wherein the deforming step produces the crystallographic texture to be characterized by basal poles tilted at an oblique angle with respect to a normal direction to a surface of the continuous bulk form.

* * * * *